US007769795B1

(12) United States Patent  (10) Patent No.: US 7,769,795 B1
Iacobovici  (45) Date of Patent: Aug. 3, 2010

(54) END-TO-END RESIDUE-BASED PROTECTION OF AN EXECUTION PIPELINE THAT SUPPORTS FLOATING POINT OPERATIONS

(75) Inventor: Sorin Iacobovici, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1443 days.

(21) Appl. No.: 11/145,397

(22) Filed: Jun. 3, 2005

(51) Int. Cl.
*G06F 7/38* (2006.01)
*G06F 11/00* (2006.01)
(52) U.S. Cl. ..................... 708/233; 708/530
(58) Field of Classification Search ......... 708/200–233, 708/490–491, 530
See application file for complete search history.

(56) References Cited

U.S. PATENT DOCUMENTS

| 3,659,089 | A | * | 4/1972 | Payne et al. ............ 708/531 |
| 3,814,923 | A | * | 6/1974 | Wang ....................... 708/532 |
| 3,816,728 | A | * | 6/1974 | Chen et al. .............. 708/532 |
| 3,873,820 | A | * | 3/1975 | Parr et al. ................ 708/532 |
| 4,870,607 | A | * | 9/1989 | Ishizuka ................... 708/532 |
| 5,355,470 | A | * | 10/1994 | Lexau et al. .............. 714/55 |
| 5,574,928 | A | * | 11/1996 | White et al. .............. 708/495 |
| 5,742,533 | A | * | 4/1998 | Moncsko .................. 708/530 |
| 6,519,730 | B1 | * | 2/2003 | Ando et al. ............... 714/746 |
| 7,376,890 | B2 | * | 5/2008 | Busaba et al. ............ 714/808 |
| 2005/0172172 | A1 | * | 8/2005 | Beacom et al. ........... 714/39 |

OTHER PUBLICATIONS

U.S. Appl. No. 11/135,982, filed May 24, 2005, and naming as inventor(s) Sorin Iacobovici.
U.S. Appl. No. 11/209,124, filed Aug. 22, 2005, and naming as inventor(s) Sorin Iacobovici.

* cited by examiner

*Primary Examiner*—Chat C Do
(74) *Attorney, Agent, or Firm*—Osha • Liang LLP (57) ABSTRACT

An end-to-end residue-based protection scheme protects multiple units/blocks of a floating point execution pipeline without the complexity and cost of having multiple protection schemes for the execution pipeline. Protecting an execution pipeline that supports floating point operations includes factoring in component operations, such as normalization and rounding, into a residue generated for a result. In addition, residues of operands are distilled to extract their corresponding mantissa residues, thus allowing the floating point operations (e.g., multiplication, addition, etc.) to be applied to the mantissa residues.

12 Claims, 6 Drawing Sheets

END-TO-END RESIDUE-BASED PROTECTION OF AN EXECUTION PIPELINE THAT SUPPORTS FLOATING POINT OPERATIONS

BACKGROUND

1. Field of the Invention

The invention relates to error detection and, in particular, residue-based error detection.

2. Description of the Related Art

With computers being part of every day life and critical for business, the microprocessors' reliability is a critical design requirement. This reliability, usually expressed as MTBF (Mean Time Between Failures), indicates both the error rate of the microprocessor and the capability of the microprocessor to survive many of these errors. Processor errors can be classified into two categories: 1) soft or transient errors and 2) hard or permanent errors. The error rate is reported in FITs (failures in time), where one FIT specifies one failure in a billion hours of operation. As a frame of reference, a FIT rate of 114,000 FIT for a component (a microprocessor, for example) indicates that the component has an MTBF of one year. However, if a company sells 1000 microprocessors to a customer, the microprocessor should have a FIT rate of about 114 FIT in order for that customer to experience an average of one microprocessor failure per year for this lot.

High energy particles from cosmic radiation or alpha particles in packaging materials cause soft errors affecting electronic components. Such radiation events can cause charge collection at sensitive circuit nodes, corrupting those circuit states without causing permanent damage. The radiation events primarily affect storage elements (RAM cells, latches, flip-flops) which hold a state (bit values) for a relatively long time. Radiation events and altitude affect soft error rates of different storage elements. In addition, soft error rates (SER) depend on voltage and circuit characteristics.

Combinatorial logic can be affected if a soft error occurs in the window that would cause the corrupted value to be captured in that logic's latches or flip-flops. For static logic, this window is very narrow and the logic is built with rather large transistors, which can better fight the spurious charge collected due to radiation events. For dynamic logic, the window is wider (equal to the evaluation stage of the logic) and the charge after prefetch is preserved by a half-latch ("keeper" logic). Hence, this logic is significantly more sensitive to radiation events than static logic (although less sensitive than storage elements because of the refresh due to precharge).

Left uncorrected, soft errors induce an error rate which is higher than all other reliability mechanisms. For modern microprocessors, which have large SRAM elements (mostly large caches) and are implemented in deep sub-micron technologies, the error rate, which is dominated by single bit upsets, continues to grow with the increased number of bits in each technology generation. If the single bit upsets in SRAMs are left uncorrected, the reliability (MTBF) of these microprocessors becomes unacceptable. This is the reason why most modern microprocessors implement error detection and correction (EDC) mechanisms (at least) for their caches. These mechanisms are capable of detecting and correcting single bit upsets. It has been observed in chip multi-threading microprocessors that adding EDC to the caches reduces the failure rate due to soft errors (improves MTBF) by over two orders of magnitude. With the single bit upsets for large storage elements out of the way, the failure rate due to soft errors (FRSE) is dominated by the SER of smaller, unprotected storage structures, like register files, buffers and queues etc., as well as the SER of the flip-flops and latches in the microprocessor's logic.

For modern microprocessors that correct single bit upsets in their caches, the hard error rate becomes another significant reliability component. The hard errors, which are the result of either process or manufacturing defects, or of processor wear-out (electromigration, thermal cycling etc.), are becoming more frequent as microprocessors are implemented in ever denser, deep sub-micron technologies. The main reasons for this are increased power densities in transistors and interconnect due to smaller device and interconnect geometries, higher transistor count, power management techniques that might result in thermal cycling, etc. As the hard errors reflect failures in the chip's transistors and interconnect, the hard error rate of a block is proportional with that block's area.

For correctable errors, the error detection mechanisms in a microprocessor usually differentiate between soft and hard errors based on the success of the correction mechanism to recover from the error. All detected errors are, normally, communicated to software by either interrupts (in the case of errors corrected by special hardware mechanisms, as described below) or by traps (in the case of errors corrected by instruction retry initiated by hardware or software). Typically, the software tallies the different errors and, if a certain error occurs more than a preset number of times, then that error is declared a hard error and treated accordingly. The software could also keep track of errors in different components for preventive maintenance, in order to identify and report the components with error rates above an acceptable threshold.

A microprocessor's errors can be classified as a function of the existence of EDC mechanisms for that error. Errors can be classified into the following four main classes:

1. Detected and correctable errors: the error can be detected and the correct value can be recovered. This type of coverage can be achieved by error correction codes (ECC), by parity or residue detection of errors in write-through caches (the parity or residue error forces a miss and, as a result, a refresh of the cache line) or by error detection (parity, ECC, residue, etc.) in storage structures that do not hold architectural state, in logic gates or in flip-flops (if covered). The error correction for these soft errors is done by either hardware or software. In hardware, the error correction is done by either special state machines (e.g. correcting and writing back a dirty line with a single-bit error in a write-back cache before returning the corrected data to the pipeline) or by clearing the pipeline when an instruction with an error tries to commit and re-executing the instructions pending in the pipeline, beginning with the instruction affected by the error. In the case of software correction, the error usually causes a precise trap when the first instruction affected by the errors tries to commit. The trap's service routine can then correct the error using processor hardware that allows it to access the storage elements affected by the error.

2. Detected and uncorrectable errors (DUE errors): the error is detected, but cannot be corrected, resulting, in some systems, in an application or system crash. Parity errors, ECC-detected multi-bit errors in write-back caches, or residue errors in an architectural register are examples of such detected, but uncorrectable errors (at least not correctable by the detecting mechanism).

3. Undetected and unimportant errors: while an error occurred, it affected a structure which is part of speculation, so it does not impact correctness (e.g. a branch predictor). Actually those errors are detected and corrected as part of the normal processor functionality of checking the correctness of the speculation, so the error recovery is indistinguishable from recovering from a wrong speculation.

4. Undetected and uncorrectable errors: an error occurred, but was undetected and caused silent data corruption. These are also known as Silent Data Corruption (SDC) errors. SDC errors can affect the processor state for a significant amount of time without being detected. They are considered the most dangerous type of errors and should be eliminated as much as possible.

Error detection is the most important reliability function in a microprocessor, as an undetected error could silently corrupt the system's state, with potentially grave consequences. Microprocessors designed for mission critical systems, for servers, etc., invest a large percentage of their area and power budgets for error detection and, when possible, correction to avoid faults from SDC errors. IBM's G4/G5 microprocessors have two identical copies of the pipeline (the I-unit and E-unit), sharing the first-level caches, which are parity protected. Pipeline errors are detected by comparing the results from the two I- and E-units. The arrays holding the processor state (register files, store buffer) are ECC protected. In case of an uncorrectable or hard error the G5 processor signals the operating system to transfer the state of the failed processor to the dispatch queue of a different processor in the system. The failed processor is taken out of the active configuration and the task it was executing is restarted on the new processor with the proper priority. Duplicating the I- and E-units improves error detection, but at a high price in area and power of about 35% chip area overhead.

Fujitsu's 5th generation SPARC64 microprocessor achieves error detection by using a variety of error detection mechanisms like parity and ECC on the caches, register files, parity prediction and checking for ALUs and shifters, 2-bit residue checker for the multiply/divide unit, etc. Parity check also covers over 80% of the chip's latches, including all data path latches. Error recovery is done by re-issuing (retrying) at commit an instruction that cannot commit due to an error that affected its execution. All of these error detection mechanisms and their checkers sprinkled throughout the chip benefit reliability, but add significant complexity and area to the chip.

The DIVA and the SplitDiva checker architectures not only detect errors in the pipe, but also incorrect results due to design corner cases (those cases of a strange combination of happenings and circumstances that conspire to generate errors). These checker architectures achieve this by providing a checker in addition to the core processor. The checker, which can be simpler and slower than the core processor, executes the same instructions as the core, checks the correctness of these instructions and retries instructions that fail. The checker is also designed to take over the program execution in case of a hard core processor failure, but with poor performance. DIVA delivers error detection and correction (including surviving design corner cases, uncorrectable errors and hard errors), but at a significant cost in area and power.

Run-Ahead Execution (RAE) is a microarchitecture optimization that attempts to prefetch for loads further down the execution path when the processor has a lengthy stall (e.g., a load missing the L2 cache). Though RAE is a performance optimization technique primarily, it also improves the failure rate due to soft errors, because the residence time of data in unprotected registers and flops on the processor core is bounded by the initiation of RAE and consequent flushing on a lengthy stall.

Error detection techniques for existing high reliability microprocessors, suffer from high area and power overhead, and might be overkill for most markets. After EDC is added to caches, the unprotected regular structures (e.g. register files) become some of the most important contributors to the failure rate due to soft errors, while the execution units, which occupy a large portion of each processor core's area, are some of the most important contributors to the hard error rate, and, to a lesser extent, soft error rate.

As discussed above, conventional processors mostly detect errors in random access memory, although there is also a need to detect errors arising from register files, execution units, buffers, etc. One of the most efficient (i.e., low overhead) ways for detecting errors in execution units is with residue checking. Residue checking has been implemented for arithmetic units (adders, multipliers, dividers). Some mainframes (e.g., Amdahl's 5990A and 5990M) use a module 3 (2-bit) residue checker for its multiply/divide unit. More recently, microprocessors, such as Fujitsu's SPARC64 microprocessors, adopted the same technique (also for error detection in the multiply/divide unit). The motivation for employing residue-based error detection for their arithmetic units is 1) that the technology of these microprocessors makes transient errors in those units more probable, and 2) that, in time, hard errors could occur in these units and, if not detected, could result in silent data corruption.

Though conventional techniques protect arithmetic units with residues, these techniques are piece-meal and require inefficiently crossing many protection domains variously protected by parity, ECC and residues. Accordingly, a technique is desired that maximizes error detection (minimum silent data corruption in case of an error) with minimum area overhead and minimum complexity.

SUMMARY

It has been discovered that an entire floating point execution pipeline, including storage and floating point functional units, can be protected with a residue protection scheme. The protection scheme utilizes residue-based error detection to detect errors that may occur while an instruction instance resides in the execution pipeline. The residue-based protection scheme includes logic that accommodates the various fields of floating point data (e.g., mantissa, exponent, and sign) and component operations involved in a floating point operation (e.g., normalization and rounding), as well as taking into account the precision of a floating point operation. Accommodating the specific characteristics of floating point data includes distilling a residue of a mantissa from a residue for an entire operand, which also includes the sign and the exponent of the operand. Protecting floating point operands also involves individually utilizing signs and exponents of operands in computing a residue for an instruction instance result.

These and other aspects of the described invention will be better described with reference to the Description of Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF EMBODIMENT(S)

The description that follows includes exemplary systems, methods, techniques, and instruction sequences that embody techniques of the present invention. However, it is understood that the described invention may be practiced without these specific details. For instance, the following description refers to mod-3 residue-based error detection mechanisms, but other parameters, such as larger modulus values (e.g., mod-7), may be utilized. In other instances, well-known protocols, structures and techniques have not been shown in detail in order not to obscure the invention.

In the following description, the terms instruction instance, operands, operand residues, and execution pipeline are utilized. An instruction instance is a specific instance of an instruction. For example, instructions include loads (ld) and stores (st). An instruction instance would be an instance of a load instruction (e.g., ld r3 r4). An operand is a value utilized in performing an operation. In this description, an operand is typically a result of an already executed instruction instance, thus its residue has already been computed. The already computed residue of an operation is referred to herein as an operand residue. An execution pipeline is the execution stage of an instruction pipeline. Although a stage in the instruction pipeline, the execution stage is itself considered a pipeline since the execution stage can be subdivided into its own stages of read, perform operation, and write or update. Although each of these stages of the execution pipeline is typically a single cycle, the length of a stage in the execution pipeline may vary. In addition, there may be variation in the number of stages in the execution pipeline.

Residues

The mod-D residue of a number N, N mod D, is the positive remainder resulting from the integer division of a signed integer N by an unsigned integer D. Residue-based error detection takes advantage of two properties of residues:

1) For arithmetic operations: (X op Y) mod D=((X mod D) op (Y mod D)) mod D

2) The residue of a number can be used for detecting errors in up to k bits of that number if D is a Merrill number ($D=2^k-1$)

The reason that mod-($2^k-1$) residues can be used to detect a number's bit errors is that the residue calculation uses all of the number's data bits in k-bit groups. This property applies to Merrill numbers only.

The residues usually employed are modulo-($2^k-1$), where k represents the number of residue bits. The ($2^k-1$) number, also known as a Merrill number, is typically employed because it is simpler to calculate the modulo-($2^k-1$) of a value. The more popular residues are 2-bit (modulo-3) and 3-bit (modulo-7) residues, which have lower overhead and are simpler to calculate. The modulo-3 residue has been shown to give good error coverage for arithmetic execution units. A modulo-3 residue can detect not only single-bit errors, but also many 2-bit errors.

To illustrate, calculating the modulo-3 (k=2) residue of a 16-bit value with a hexadecimal representation of 0xb49e begins with grouping bits (bit groups of k=2). The value is represented in base-4 as 23102132. Pairs of the bit groups are added, and the modulo-3 of the sum computed, until the final value is achieved. An equation to represent the generation of the residue may be as follows:

$$\text{residue}=(((2+3)\bmod 3)+((1+0)\bmod 3)+((2+1)\bmod 3)+((3+2)\bmod 3))\bmod 3=(((2+1)\bmod 3)+((0+2)\bmod 3)\bmod 3)=(0+2)\bmod 3=2.$$

Exemplary Systems

The described residue-based error detection technique can be applied to various systems. For illustrative purposes, a system with a chip multi-threading processor with four out-of-order execution cores is assumed for some of the examples described below. In this illustrative system, each core supports two threads (2-way simultaneous multi-threading (SMT)), for a total of eight threads per chip. A core can issue up to three instructions per cycle out of its instruction window. The two threads of a core share an instruction cache and a data cache (both parity-protected write-through caches), as well as an Integer Execution Unit (IEU) and a Floating Point Unit (FPU).

The register files consist of separate working registers and architectural registers for the integer (IEU) and floating-point (FPU) units. The working registers are shared by the two threads, while each thread has its own architectural registers. The result of an instruction instance, if any, is copied at commit time, from the assigned working register to the proper architectural register. The commit of each instruction instance, including its destination register update, is controlled by the instruction instance's assigned entry in a Commit Queue structure. This entry holds the instruction's relevant information (opcode, destination registers, etc.), as well as information gathered during the instruction's flow through the pipeline (including successful completion, program exception or error, etc.). The Commit Queue (CQ) entries are assigned to instructions, in program order, by a Decoder. CQ also commits instructions in order, as only the oldest instructions in the CQ can commit in a given clock cycle (and only if the older instruction(s) in this group, if any, is (are) also ready to commit in that cycle).

A branch mispredict, an exception or an error causes the pipe to be cleared, causing all pending instructions to be lost and later retried. An error (as well as most exceptions) could cause a precise trap (i.e. a trap that on return will start execution with the oldest instruction affected by the error). This is the main error recovery mechanism for transient errors in the pipeline, as the pipe clear should cause the storage or logic with the error to re-initialize, eliminating the erroneous value and allowing a successful completion when the instruction with the error is re-executed. The trap service routine is expected to tally the errors for both preventive maintenance reasons (identify components with unusually high error rates) and in order to identify hard errors (an error that is not corrected after causing a predetermined number of error traps is declared a hard error). Errors that cannot be eliminated through pipe clear and instruction re-execution (e.g. the cache errors) have their own correction mechanisms. For example, logic in the write-through Data Cache forces a cache miss in case of a data parity error and generates an interrupt to the proper thread, in order to communicate the error. The interrupt service routine is expected to tally the errors in a fashion similar to the way precise traps tally errors. The cache miss writes correct data from the L2 cache into the cache entry with the error, eliminating the error, if the error is correctable (i.e., the error is transitory).

Residue-Based Protection of an Execution Pipeline

A residue can be used not only as an arithmetic checker, but also as a data checker. Computing residues during the execution stage of an instruction pipeline and delaying residue checking until the commit stage of instruction pipeline, achieves protection of a processor's entire execution pipeline. Protection of the entire execution pipeline includes protecting arithmetic units, as well as regular structures (i.e., registers). If applicable, residue-based error detection is also applied to a buffer holding immediate operands.

Figure 1:
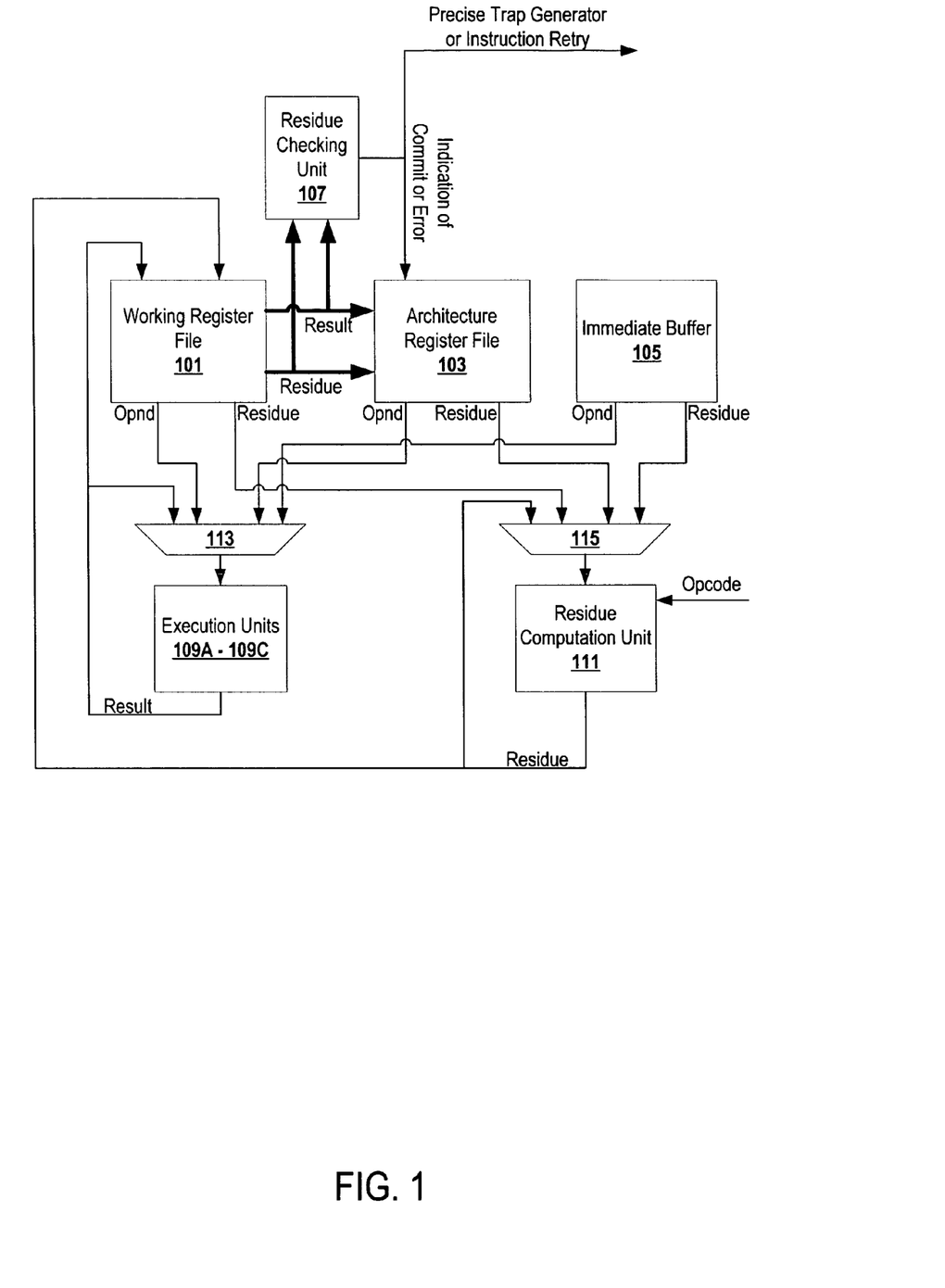
FIG. 1 depicts exemplary units of an execution pipeline and a residue-based error detection infrastructure.

FIG. 1 depicts exemplary units of an execution pipeline and a residue-based error detection infrastructure. The depicted execution pipeline units are protected with residues generated by the error detection infrastructure. The units include functional units that perform an arithmetic operation(s) of an instruction instance, and regular structures used to store operands and results of an instruction instance. FIG. 1 depicts a working register file 101, an architectural register file 103, an immediate buffer 105, execution units 109A-109C, a residue computation unit 111, and operand multiplexers 113 and 115. Although the depicted execution pipeline assumes a separate working register file and architecture file, the described invention can be applied to various architectures that may or may not separate registers into a working register file and an architectural register file. For example, a system may tag a value(s) to indicate whether the corresponding instruction instance has been retired/committed.

In FIG. 1, the working register file 101 is coupled to transmit both data (results) and corresponding residues to the architectural register file 103 and to the residue checking unit 107 at commit. Each of the working register file 101, the architectural register file 103, and the immediate buffer 105 (which may or may not be present in various architectures) is coupled to supply operands to multiplexer 113 and coupled to supply operand residues to multiplexer 115. A control signal, which is not illustrated, governs which input the multiplexers 113 and 115 select and supply to the residue computation unit 111 and execution units 109A-109C, respectively. The control signal is generated from a unit that examines instructions instances (e.g., an instruction scheduler) and determines dependencies between instruction instances. If an operand for a current instruction instance is the result of an instruction instance that has been committed, then the control signal will cause the multiplexers 113 and 115 to select input from the architectural register file 103. If an operand for a current instruction instance is the result of an executed but not yet committed instruction instance, then the control signal will cause the multiplexers 113 and 115 to select input from the working register file 101, and similarly for input selected from the immediate buffer 105. If a current instruction instance consumes the result of an immediately preceding instruction instance, then the control signal will cause the multiplexers 113 and 115 to select that result via the bypass for a particular operand.

The execution units 109A-109C are coupled to supply output (results of performing an operation indicated by an instruction instance) to the working register file 101 for storage, as well as for bypass to the multiplexer 113. The residue computation unit 111 is coupled to bypass computed residues to the multiplexer 115 as input and coupled to supply residues to the working register file 101 for storage. As with the execution units 109A-109C, the residue computation unit 111 is also coupled to receive an opcode, which governs the operation(s) to be applied to input received by the residue computation unit 111. For example, if an instruction instance indicates addition of a and b, then the opcode will indicate addition and the corresponding operand residues will be input into the residue computation unit 111. However, the residue computation unit 111 will compute the sum of the residue of a and the residue of b(res(a)+res(b)), and then generate the residue of the sum of the residues. Note that the immediate operand's residue could be generated as soon as the immediate is decoded. The immediate value and its residue are then saved in the proper immediate buffer 105 entry by a decoder.

To generate residues, the residue computation unit 111 includes logic for residue generation, which is also included in the residue checking unit 107. This logic generates/computes a residue from an input value. Exemplary logic for computing residues is depicted in FIG. 2.

Figure 2:
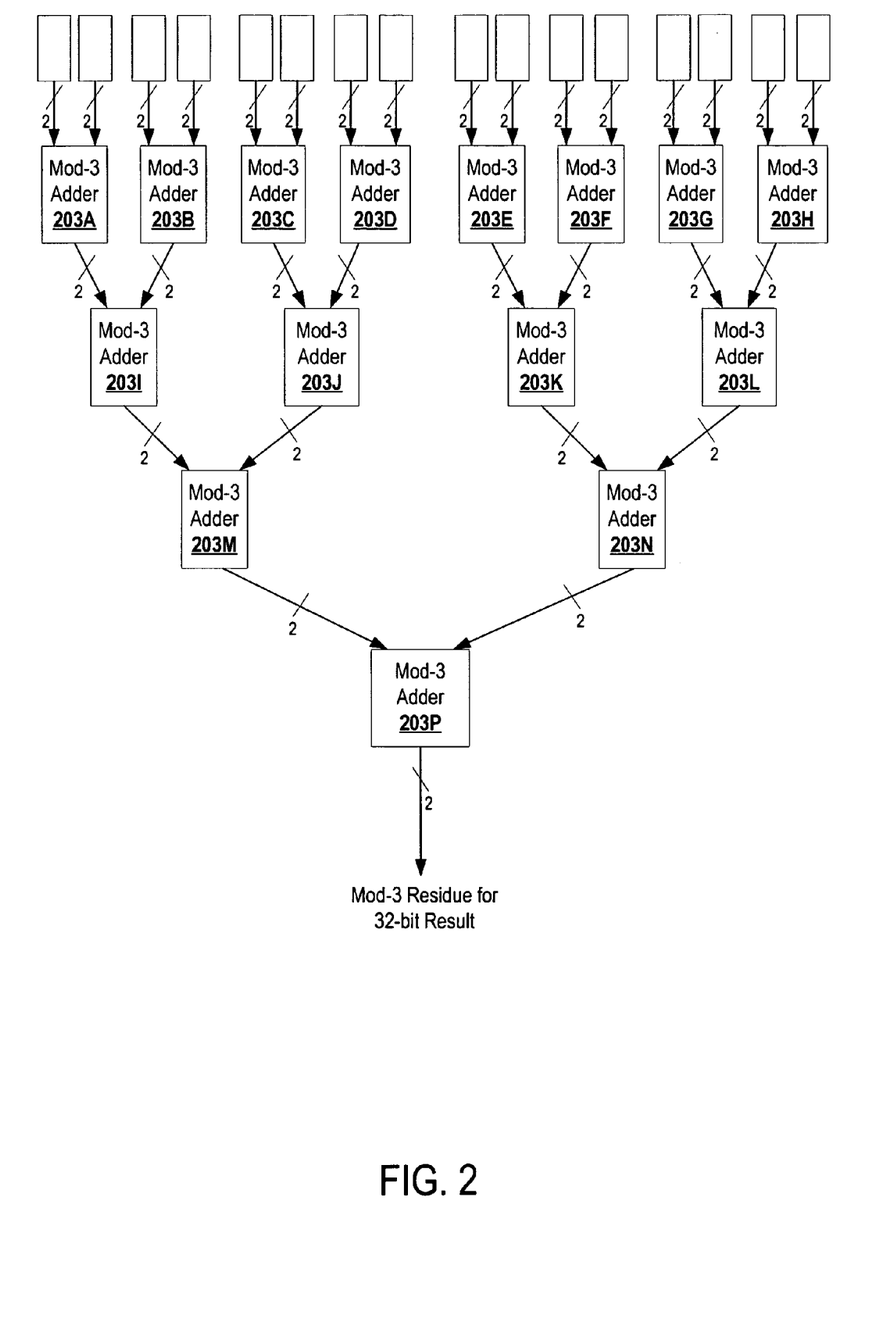
FIG. 2 depicts exemplary logic to compute modulo-3 residues.

FIG. 2 depicts exemplary logic to compute modulo-3 residues. In FIG. 2, a series of storage cells hold a 32-bit value. The storage cells are coupled to supply two 2-bit values to each of modulo-3 adder units 203A-203H. Each of the modulo-3 adder units 203A-203H adds the supplied two bit pairs and computes modulo-3 of the sum. The 2-bit representation of the result is then forwarded to another modulo-3 adder unit. In FIG. 2, the units 203A and 203B supply their output to the modulo-3 adder unit 203I. The remaining units are coupled as follows: 203C and 203D→203J, 203E and 203F→203K, and 203G and 203H→203L. Output flows from 203I and 203J to 203M, and output flows from 203K and 203L to 203N. Both outputs from 203M and 203N flow into the unit 203P, which outputs a mod-3 residue value.

Referring again to FIG. 1, the working register file 101 holds the results of instruction instances flowing through the pipe that have not yet committed. After execution of an instruction instance, the result is stored into the working register file 101 along with the result's corresponding residue. Various techniques may be utilized to maintain an association between a result and its corresponding residue. For example, results and residues may be stored in respective separate physical structures with the same indexing. When an operand stored in entry 1 of the non-residue operand portion of the working register file is selected, the corresponding entry 1 of the residue portion of the working register file 101 is selected. Continuing with the previous example, if the instruction instance indicates that the result is to be stored in entry 3, then the residue will be stored in entry 3 of the residue portion of the working register file 101, while its counterpart (the result) is stored in entry 3 of the non-residue portion of the working register file 101 as indicated by the executed instruction instance.

As described above, when an arithmetic type instruction instance is executed in the execution units 109A-109C, the same operation(s) of the instruction instance is also applied in the residue computation unit 111, to the corresponding operand residues. When the instruction instance is committed, the result of the committed instruction instance and its corresponding residue are copied from the working register file 101 to the architectural register file 103 if residue checking succeeds. Before data is written to the architectural register file 103, the data (result and corresponding residue) is sent to the residue checking unit 107, which check for errors. The residue checking unit 107 receives the result and computes a residue for the received result. After computing a residue for the result, the residue checking unit 107 compares the computed result derived result residue with the corresponding received residue derived result residue to determine whether any errors have appeared. The residue checking unit 107 outputs an indication of either commit or error to the architectural register file 103 (or to a gate preceding the architectural register file 103), which controls whether the data forwarded from the working register file 101 is written to the architectural register file 103. If an error is detected, it is possible to recover from the error since the result has not yet been committed (i.e., architectural state has not been updated).

Various mechanisms can be employed for error recovery, such as a trap handling mechanism. For example, assume a current instruction instance is marked in the commit queue as having an error. The error triggers a precise trap at commit. The precise trap is serviced by a service routine after all instruction instances prior to the current instruction instance have retired. This precise trap's service routine tallies the error for further statistical analysis and initiates a re-execution of the instruction instance. If the original error was due to a soft error in the working register file 101 or execution units 109A-109C, then the re-execution clears the error because the working register file 101 and the execution units 109A-109C are re-initialized when the pipeline is cleared as part of handling the trap. If the re-execution also fails, the error may be due to an uncorrectable error (hard error) in the architectural register file 103. In order to overcome this hard error, the software might choose to move the failing core's state to another core.

Although ECC codes may be employed in the architectural register file 103 for correction of errors in the architectural register file, residues are used for error detection in the architectural register file 103 as well as the working register file 101 and execution units 109A-109C. For single-bit architectural register file errors, including hard errors, there is no failure. However a single-bit architectural register file hard error could result in a significant performance degradation due to repeated traps, which can be addressed with failover to another core.

The address of loads and stores, as well as the address of branches, are also calculated by the execution units 109A-109C, but are not saved in the working register file 101. For loads and stores, the residue accompanies the address and can be used, as part of the cache access, for checking the address correctness. For branches the target address correctness is checked at commit, as part of the program counter update.

As shown in FIG. 1, the working register file 101, the architectural register file 103, and the immediate buffer 105, hold not only the non-residue values (non-residue operands and results), but also their corresponding residues. Storing both a result and a residue thereof avoids calculating the residues for the result before execution time, saving gate delays and area. Most processors today use parity to detect errors in the working register file, the architectural register file, and the immediate buffer. Such a parity protection mechanism requires a parity checker for each operand to the arithmetic execution units, and a residue generator for each operand to the execution units that use residues for error detection, usually in a multiplier/divider. Storing both the result of executing an instruction instance and the corresponding residue allows any error in any one of the input operand for the instruction instance, the result of the executed instruction instance, or the residue to be detected at commit time as described above, without the need for extra checkers. If the error is transient, the processor will recover from it. Applying residue-based protection also allows detection of design corner cases, and in some cases, recovery, because the execution units and the residue computation unit use different logic for most arithmetic operations. As depicted in FIG. 1, the arithmetic execution units and the residue computation unit use different data paths and, in most cases, different control paths.

In high speed processors, the result and the corresponding residue are usually saved in different structures because the residue is calculated, in many cases, one cycle or two after the instruction instance execution result is computed. However, the stages of the execution pipeline can be engineered in various ways to change the time between computation of a result and computation of a corresponding residue (e.g., the computations may be staggered so that the residue computation begin one or more stages after the computation of the result, the computations may be in parallel, etc.).

The described residue-based error detection mechanism replaces parity as the error detection mechanism for register files. This not only improves error detection (two bit errors are also detected), but also allows end-to-end coverage, using residues, of both the register files and the corresponding execution units. As a result, the power and area overhead of the error detection mechanism is kept to a minimum, by eliminating a lot of the intermediate error checking overhead existing in other solutions that mix parity with residues, etc. This end-to-end error detection also has minimal performance impact. The low overhead makes execution unit error detection (and, for soft errors, correction) convenient for most processors.

Residue-Based Protection for Floating Point Execution Pipelines

Protecting an execution pipeline that performs floating point operations involves more considerations than protecting the generic described above. For protecting units that perform floating point operations, the residue-based error detection infrastructure includes logic to accommodate the fields that are specific to floating point values, such as sign, mantissa, and exponent, and the component operations involved in floating point operations, such as rounding and normalizing.

Exemplary Arrangement of Units

Figure 3:
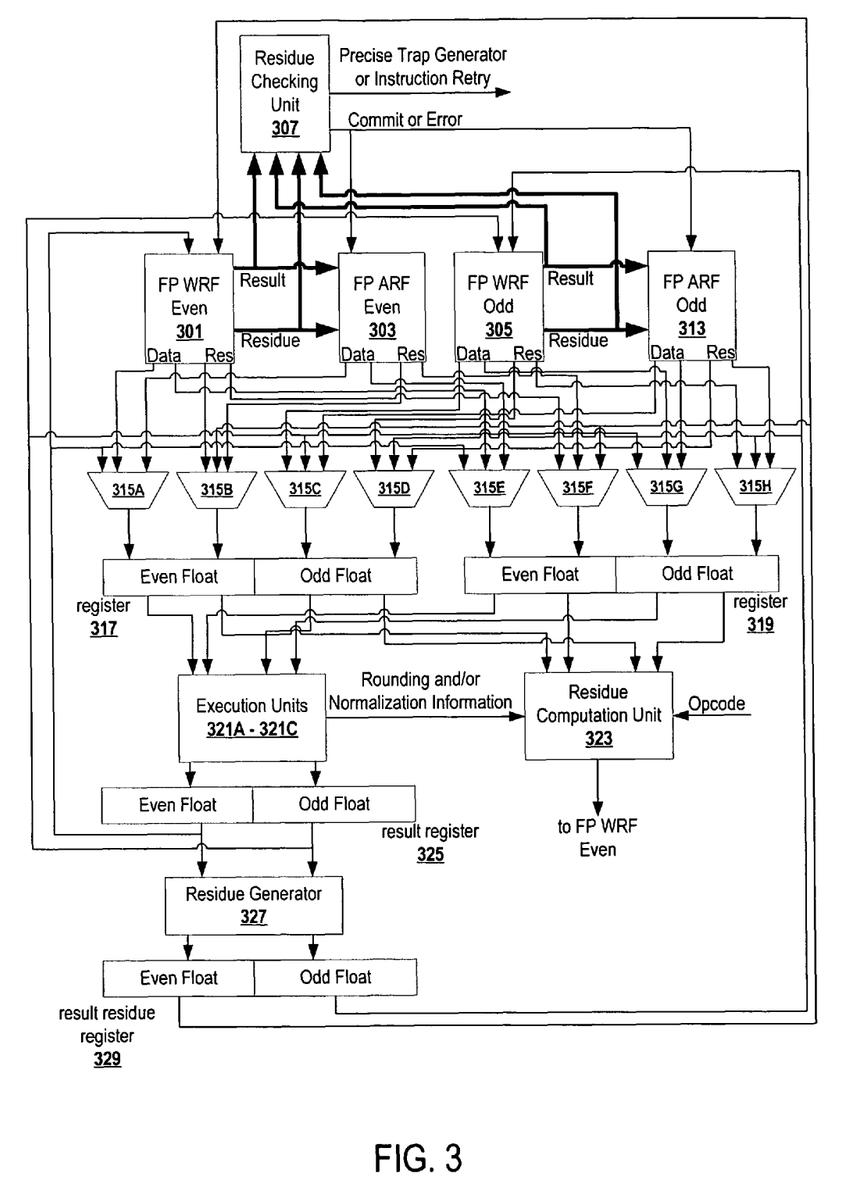
FIG. 3 depicts exemplary units for residue-based error detection that protects floating point registers and floating point execution units.

FIG. 3 depicts exemplary units for residue-based error detection that protects floating point registers and floating point execution units. FIG. 3 assumes a pipeline micro architecture with floating point working register file separate from the floating point architectural register files. Since most architectures that handle floating point operations use an even and an odd single-precision registers as the even and odd halves of the corresponding double-precision register, this example assumes separate working and architectural register files for even and odd single-precision operands. The floating point working register file 301 and 305 entries hold the results of executed instruction instances flowing through the pipe (not committed). At execution time, the result of executing a floating point instruction instance is saved in the proper floating point working register file entry(s). FIG. 3 depicts a floating point working register file even 301, residue checking logic 307, a floating point architectural register file even 303, a floating point working register file odd 305, and a floating point architectural register file odd 313. The floating point working register file even 301 is coupled to send data (results) and corresponding residues to both the residue checking logic 307 and the floating point architectural register file even 303. The floating point working register file even 301 is also coupled to send operands to multiplexers 315A and 315E and residues to multiplexers 315B and 315F. The floating point working register file even 301 is coupled to receive input from floating point execution units 321A-321C via an even portion of a result register 325, input from a residue computation unit 323, and input from a residue generator 327 via an even portion of a result residue register 329. The floating point architectural register file even 303 is coupled to output operands to multiplexers 315A and 315E, and output residues to multiplexers 315B and 315F. The floating point working register file odd 305 is coupled to receive input from the floating point execution units 321A-321C via an odd portion of the result register 325, input from a residue generator 327 via an odd portion of the result residue register 329, and input from the residue computation unit 323. The floating point working register file odd 305 outputs operands to multiplexers 315C and 315G, and outputs residues to multiplexers 315D and 315H. The floating point working register file odd 305 also outputs results and corresponding residues to the residue checking logic 307 as well as the floating point architectural register file odd 313. The floating point architectural register file odd 313 outputs operands to multiplexers 315C and 315G, and outputs residues to multiplexers 315D and 315H.

The multiplexers 315A and 315B respectively output operands and residues to an even portion of a register 317. The multiplexers 315C and 315D respectively output data and residues to an odd portion of the register 317. The multiplexers 315E and 315F respectively output operands and residues to an even portion of a register 319. The multiplexers 315G and 315H respectively output operands and residues to an odd portion of the register 319. The multiplexers 315A and 315E are also coupled to receive bypassed input from the even portion of the result register 325. The multiplexers 315C and 315G are also coupled to receive bypassed input from the odd portion of the result register 325. The multiplexers 315B and 315F are coupled to receive bypassed input from an even portion of the result residue register 329, and the multiplexers 315D and 315H are coupled to receive bypassed input from an odd portion of the result residue register 329. Although not depicted, each of the multiplexers 315A-315H are coupled to receive a control signal from one or more units (e.g., an instruction scheduler) that decode instruction instances. The control signal dictates which source of input will be selected and forwarded to the floating point execution units 321 and the residue computation unit 323 (e.g., whether from the working register file, the architectural register file, bypass, etc., as in the above integer example).

The registers 317 and 319 are coupled to output operands to the floating point execution units 321 and output residues to the residue computation unit 323. The floating point execution units 321 are coupled to output to the result register 325. The residue computation unit 323 is coupled to output computed residues to the floating point working register files 301 and 305. The result register 325 is coupled to output to the residue generator 327, which is coupled to output to both even and odd portions of the result residue register 329. For single-precision floating point operations, at commit, the residue checking unit 307 generates a residue from the result and compares the currently generated residue against the previously computed residue. For double-precision, the residue checking unit 307 generates a residue from the double-precision result, and compares the currently generated residue against the corresponding residue previously computed and stored in the even working register file 301.

The above floating point architecture is provided as an example to aid in understanding the described invention. Those of ordinary skill in the art will appreciate that the described invention can be applied in an architecture that does not have even/odd pairs of registers for double-precision floating point storage. An architecture may implement registers of sufficient size to accommodate single-precision and double-precision values, thus reducing the complexity of the couplings between logic. Furthermore, a system may maintain different logic for protection of the integer data path and the floating point data path. Another system may implement logic that accommodates floating point values and operations and that leverages the floating point logic to handle integer operations.

Operation of the Exemplary Residue-Based Error Detection Infrastructure for Floating Point Operations In this exemplary system, the residues generated by the residue generator 327 and saved in the floating point working register file(s) are the residues for the 32-bit even and odd portions of the result, in the case of a double-precision result. In the case of a single-precision result, a residue for a 32-bit result is saved in either one of the floating point working register file even 301 or the floating point working register file odd 305, depending upon whether the corresponding single-precision result was stored in an even or odd register. A residue may be computed, one cycle or more after the corresponding result is computed, so the data result and the corresponding residue are usually saved in different floating point working register file structures, as with the above integer based examples. During the execution of a floating point instruction instance, the residue computation unit 323 uses the residue of operands to compute a residue of the result. As already described, the residue computation unit applies the operation indicated by a floating point instruction instance to the residues of the operands of the instruction instance. Of course, the precision of the data result will affect the corresponding residue (e.g., whether the residue is for a single-precision result or a double-precision result). For this example, it is assumed that the pipeline's renamer block assigns a pair of even and odd entries in floating point working register file even 301 and floating point working register file odd 305, respectively. For this example, it is assumed that residues from the residue computation unit 323 are saved in floating point working register file even 301, together with the corresponding even residues generated by the residue generator 327.

At commit, a result (data) and residue of the committed instruction instance (both for operands and for results) are copied from the proper floating point working register file entry(ies) for 301 and 305 to the destination floating point architectural register file entry(ies) for 303 and 313. It is also at commit time that the residue checking unit 307 generates a residue from the result and compares the generated residue against the previously computed residue in the floating point working register file even 301 (i.e., the residue generated during execution by the residue computation unit 323). The residue checking unit 307 is coupled to the floating point architectural register files 303 and 313 to indicate whether an instruction instance should be allowed to commit or whether an error as been introduced during execution of the instruction instance. The residue checking unit 307 also cause either a precise trap to be generated or an instruction retry if an error is detected. The commit unit knows the precision of the instruction instance being committed, so it will read the proper result and the proper residue for the comparison. As no architectural state is changed up to this point, an error could be corrected through retry. Of course, a hard error will continue to generate errors and could be detected by tallying the errors and checking if their count passes a given threshold.

Residue-Based Error Detection for a Floating Point Multiplier

As previously stated, protection of floating point operations accommodates floating point data formats. A residue-based error detection mechanism takes into account the component operations of floating point multiplies, which at least include operand multiplication, exponent addition, rounding, sign calculation, etc.

Figure 4:
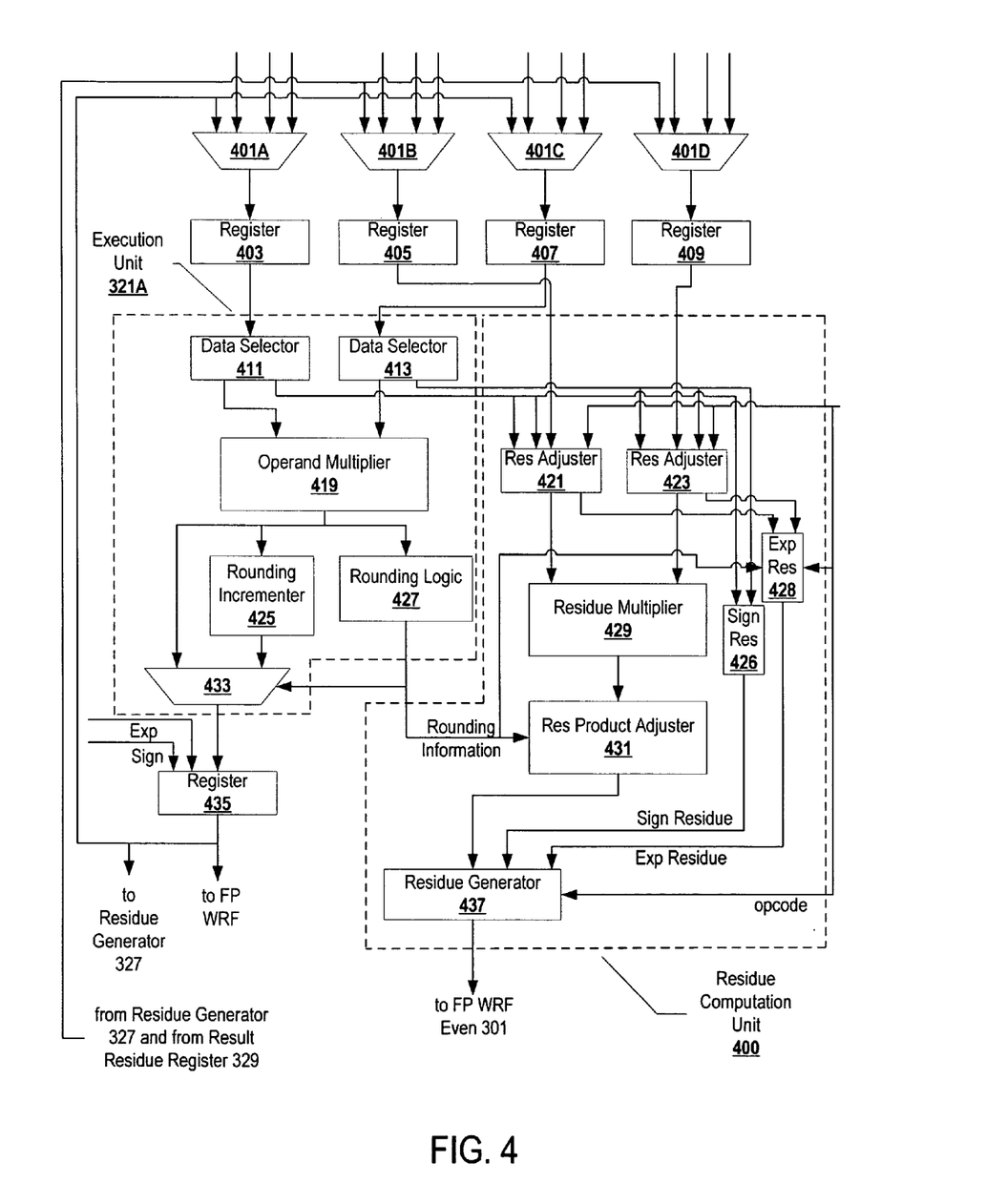
FIG. 4 depicts an exemplary floating point multiplier with residue-based error detection.

FIG. 4 depicts an exemplary floating point multiplier with residue-based error detection. In FIG. 4, a residue computation unit 400 is depicted as including residue adjusters 421 and 423, residue multiplier 429, product residue adjuster 431, a sign residue generator 426, an exponent residue generator 428, and residue generator 437. FIG. 4 also depicts multiplexers 401A-401D, which respectively select data to be forwarded to operand register 403, operand residue register 405, operand register 407, and operand residue register 409. The multiplexers 401A-401D correspond to the multiplexers 315A-315H of FIG. 3 (i.e., the multiplexers 401A-401D handle both odd and even operands and operands residues for double-precision floating point operations). The multiplexers 401A-401D receive input from the residue generator 327, the result residue register 329, as well as input from the other sources illustrated in FIG. 3. The registers 403 and 405 correspond to the even portion of the operand register 317 and the registers 407 and 409 correspond to the even portion of the operand register 319. The registers 403 and 407 store operands, and the operand residue registers 405 and 409 store residues. The operand registers 403 and 407 respectively output their contents to data selectors 411 and 413. The residue operand residue registers 405 and 409 respectively output their contents to residue adjusters 421 and 423. The residue adjusters 421 and 423 are also coupled to receive opcodes. The residue adjusters 421 and 423 operate in accordance with the opcode, which indicates whether the corresponding instruction instance is for single-precision or double-precision. The data selectors 411 and 413 are coupled to output signs and exponents of operands to the residue adjuster 421 and 423, respectively, as well as coupled to output operands to an operand multiplier 419. The data selectors 411 and 413 are also coupled to output signs to the sign residue generator 426 and exponents to the exponent residue generator 428.

FIG. 4 also depicts one of the execution units 321A as a floating point multiplier that includes the data selectors 411 and 413, the operand multiplier 419, a rounding incrementer 425, rounding logic 427, and a multiplexer 433. The data selectors 411 and 413 parse input operands to output the signs and exponents as described above. The operand multiplier 419, which operates on the signs, mantissas, and exponents of operands, is coupled to output to the rounding logic 427, the rounding incrementer 425, and a multiplexer 433. The multiplexer 433 also receives input from the rounding incrementer 425. The multiplexer 433 either selects the product computed by the operand multiplier 419 or the incremented product from the rounding incrementer 425 in accordance with a signal received from the rounding logic 427, and outputs the selected input to a register 435, which also receives a sign and exponent. The register 435 provides its output to the appropriate entry(ies) in the floating point working register file(s), such as the working register files 301 and 305, as well as providing output (the result of the floating point operation(s)) to the residue generator 327 of FIG. 3.

Single-Precision Floating Point Multiplication

The residue adjusters 421 and 423 use the signs and exponents received from the data selectors 411 and 413 to adjust the input residues. The residue adjusters 421 and 423 output the residues of the mantissas first, because the mantissas of the operands, plus their "hidden one" bits, represent the multiplicand and multiplier operands. The operand residues that are stored in the register files (either working or architecture) or received via bypass conform to the following: Resid= $(2^{31}*Sign+2^{23}*Exponent+Mantissa)$ mod 3. Each operand's sign value and exponent residue can be utilized to distill residues of each single-precision multiplication operand as follows: Resid_Mantissa=(Resid−2*Resid_Exponent−2* Sign) mod 3. Hence, each of the residue adjusters 421 and 423 includes logic to compute residue of an operand's exponent, which is forwarded to the exponent residue generator 428 for the result. Each of the residue adjusters 421 and 423 also add the "hidden one" bit to generate the operand's multiplication residue as follows: Resid_Oprnd=$(2^{23}+Mantissa)$ mod 3=(2+ Resid_Mantissa) mod 3.

Once the multiplication residues are computed by the residue adjusters 421 and 423, the residue of the result of multiplying the operand residues is calculated by the residue multiplier 429 before rounding. A residue is generated for the mantissa of the result after consultation of the rounding information provided from the rounding logic 427. Each "version" of the residue of the mantissa (e.g., prior to adjustment to account for rounding, adjustment to account for the hidden one, etc.) of the result can be considered an intermediate residue. This rounding information includes a rounding bit, a residue of the truncated bits, indication of special number or normal result, and an exponent increment. The exponent increment is used not only to update the exponent residue accordingly, but also used by the logic that generates the result's mantissa.

The exponent residue generator 428 adds exponent residues received from the residue adjusters 421 and 423, and computes a residue (e.g., modulo-3) of the exponent residue sum. The exponent residue generator 428 also utilizes the exponent increment to make appropriate adjustments. The computed exponent residue from the exponent residue generator 428 and the sign residue from the sign residue generator 426 are output to the residue generator 437.

The residue multiplier 429 computes a residue of the product of the provided residues. The residue multiplier 429 outputs to the product residue adjuster 431. The product residue adjuster 431 also receives input from the rounding logic 427. The product residue adjuster 431 adjusts the input product residue in accordance with information from the rounding logic 427, as well as adjusting for removal of the "hidden one" bit to get the mantissa's residue. The product residue adjuster 431 outputs to the residue generator 437. The residue generator 437 combines the adjusted product residue with the sign and exponent residues, and computes a residue across the combined residues. The residue generator 437 outputs to the appropriate entry in the floating point working register file even 301. Thus, the appropriate entry in the floating point working register file even 301 has stored therein the residue generated directly from the floating point operation result by the residue generator 327 and a residue computed from operand residues and generated by the residue generator 437. The depicted floating point multiplier residue computation unit could also execute SIMD and integer multiplies in addition to floating point multiplies. These multipliers would share the same data path, with the proper results muxed into the result register as a function of the instruction type.

Exemplary Operation of the Residue Protected Floating Point Multiplier

Assuming a floating point format as defined by IEEE Std 754-1985, the floating point data has 3 fields:
  sign field, which is 1 bit for both single- and double-precision data
  exponent field, which is 8 bits for single-precision and 11 bits for double-precision data
  mantissa field, which is 23 bits for single-precision and 52 bits for double-precision data) plus the extra leading 1, which is not stored)

Of course, those skilled in the art will appreciate that the described invention can also be applied to extended precision. As each operand could represent either 32 bits of a double-precision (64-bit) operand or each operand represents a single-precision operand, the residue of each 32-bit field of the result is generated by the residue generator 327 over all 32-bits (possibly including the sign and exponent fields) before being saved in the appropriate floating point working register file entry, or the appropriate floating point architecture file if at commit.

Single Precision: Exponent Increment is One and Normal Result

This is the case where data bit D[47] of the multiplication result generated by the operand multiplier 419 is one, so the mantissa of the result starts with bit D[46] (i.e., the result of the multiplication operation is a normal value that requires incrementing the exponent). If a rounding bit of one is added, it is added to bit D[24] and 24 bits of the multiplication result (D[23:0]) are truncated. To generate the mantissa, bits D[47] and D[23:0] from the multiplication result are removed and the rounding bit is added to D[24], before shifting the result 24 bits to the right. To compute a residue, these operations are accommodated as follows:

Remove D[47]: subtract 2 ($2^{47}$ mod 3) from (add 1 to) the calculated multiplication result residue, mod 3

Truncate D[23:0]: subtract the residue of the truncated bits (provided by the rounding logic 427), mod 3

Add rounding bit (to D[24]): add the rounding bit value (provided by the rounding logic 427) to the calculated multiplication result residue, mod 3

Shift the result 24 bits to the right: since the bits shifted out are zero (the value has already been subtracted out) and an even number of bits are shifted out, the shift does not change the residue value (3 is a Merrill number)

The result's exponent residue is calculated as (Operand1's exponent residue+Operand2's exponent residue+1) mod 3. The result's sign is calculated as: Operand1's sign^Operand2's sign. The 32-bit result is the concatenation of the sign, exponent and mantissa fields and can be written as: $2^{31}$*Sign+$2^{23}$*Exp+Mantissa. The residue of the 32 bit result can be calculated as: ($2^{31}$*Result_Sign+$2^{23}$*Result_Exp+Result Mantissa) mod 3=(2*Result_Sign+2*Result_Exp_residue+Result_Mantissa_residue) mod 3.

Single Precision: Exponent Increment is Zero and Normal Result

This is the case where data bit D[47] of the multiplication result is zero and D[46] is one, so the mantissa of the result starts with bit D[45]. If a rounding bit of one is added, it is added to bit D[23] and 23 bits of the multiplication result (D[22:0]) are truncated. To generate the mantissa, bits D[46] and D[22:0] from the multiplication result are removed and the rounding bit is added to D[23], before shifting the result 23 bits to the right. In order to compute a residue of the result's mantissa, the following is performed:

Remove D[46]: subtract 1 ($2^{46}$ mod 3) from (add 2 to) the calculated multiplication result residue, mod 3

Truncate D[22:0]: subtract a residue of the truncated bits (provided by the rounding logic 427) from the calculated multiplication result residue, mod 3

Add rounding bit (to D[23]): add the rounding bit value (provided by the rounding logic 427)*2, mod 3 to the calculated multiplication result residue, mod 3

Shift the result 23 bits to the right: since the bits shifted out are zero and an odd number of bits are shifted out, the shift is equivalent to dividing the value calculated so far by $2^{23}$. This can be written as multiplying by 2 and shifting right by $2^{24}$. As 3 is a Merrill number, it means that the shift is equivalent to multiplying the residue calculated so far by 2, mod 3.

The result's exponent residue is calculated as: (Operand1's exponent residue+Operand2's exponent residue) mod 3. The rest of the 32-bit result's residue calculation is done as already described above.

Single Precision: Exponent Increment is Two and Normal Result

This is a corner case where both mantissas' bits were all 1s. The rounding bit and residue of D[23:0] from the rounding logic 427 are guaranteed to be one and zero respectively in this case (error otherwise). To generate the mantissa, bits D[48] and D[23:0] are removed from the multiplication result and the rounding bit is added to D[24], before shifting the result 23 bits to the right. For a mod 3 residue this affects the multiplication result as follows (in order to get the result's mantissa):

Remove D[48]: subtract 1 ($2^{48}$ mod 3) from (add 2 to) the calculated multiplication result residue, mod 3

Truncate D[23:01]: the truncated bits' residue provided by the rounding logic 427 should be zero in this case, so no change Add rounding bit (to D[24]): add the rounding bit value of one to the calculated multiplication result residue, mod 3

Shift the result 24 bits to the right: as the bits shifted out are zero and an even number of bits are shifted out, the shift does not change the residue value In this case, −1 and +1 above cancel each other, which means that the result mantissa's residue equals the calculated multiplication result residue. The result's exponent residue is calculated as: (Operand1's exponent residue+Operand2's exponent residue+2) mod 3. Again, the rest of the 32-bit result's residue calculation is done as described in the other scenarios above.

Special Number Result

If the multiplication result is a special number (NaN, etc.), then the commit stage will not check the residue and assume that the calculation is correct. Usually, the commit stage will communicate this special number condition to the pipeline by generating an exception (trap). Hence, a residue is not calculated in this case.

Double Precision Multiplication

The residue adjusters 421 and 423 generate the residues of the mantissas first, because the operands' mantissas, plus their "hidden one" bits, represent the multiplicand and multiplier operands. The operands' residues (as well as their data) are read in this case from both even and odd floating point working register files or floating point architectural register files for each operand, or are received on bypass. These entries hold the even and odd 32-bit halves of the operand. The 64-bit residue can be immediately computed using the even and odd residues, as follows:

Resid_64b=($2^{32}$*Odd_32b+Even_32b)mod 3= (Resid_32b_Odd+Resid_32b_Even)mod 3.

As for double-precision operands:

Resid_64b=($2^{63}$*Sign+$2^{52}$*Exponent+ Mantissa)mod 3.

The operand's sign value and exponent's residue can be used to get the residue of the multiplicand operand as follows:

Resid_Mantissa=(Resid_64b−Resid_Exponent−2* Sign)mod 3.

Adding the "hidden one" bit to generate the multiplier operand's residue:

$$\text{Resid\_Oprnd} = (2^{52} + \text{Mantissa}) \bmod 3 = (1 + \text{Resid\_Mantissa}) \bmod 3,$$

where $2^{52}$ accounts for the "hidden one" bit of the multiplier operand.

Once the operands' residues are calculated, the residue of the result is calculated before the rounding by the residue multiplier 429. The next step is to generate the result's mantissa residue using the rounding information provided by the rounding logic 427. This rounding information provided includes a rounding bit, a residue of the truncated bits, special number or normal result indication, and an exponent increment. The exponent increment is used not only to update the exponent residue accordingly, but also by the logic that generates the result's mantissa (i.e., the residue generator 437). The logic for the 64-bit result's residue generation (sign, exponent and mantissa) can be easily generated using the same reasoning as for the single-precision operands (the size of the exponent and mantissa fields are different). This is the residue saved in the floating point working register file even 301 and used for checking of floating point operations at commit time as already described (this residue is in addition to the two (even and odd) 32-bit residues of the result, which are generated from the result's data by the residue generator 327 and are saved in floating point working register file even 301 and floating point working register file odd 305, respectively).

Residue-Based Error Detection of a Floating Point Adder

As previously stated, protection of floating point operations accommodates floating point data formats. Computing residues to detect errors in floating point additions must accommodate component operations of an addition, such as operand alignment and addition, result normalization, rounding, etc.

Figure 5:
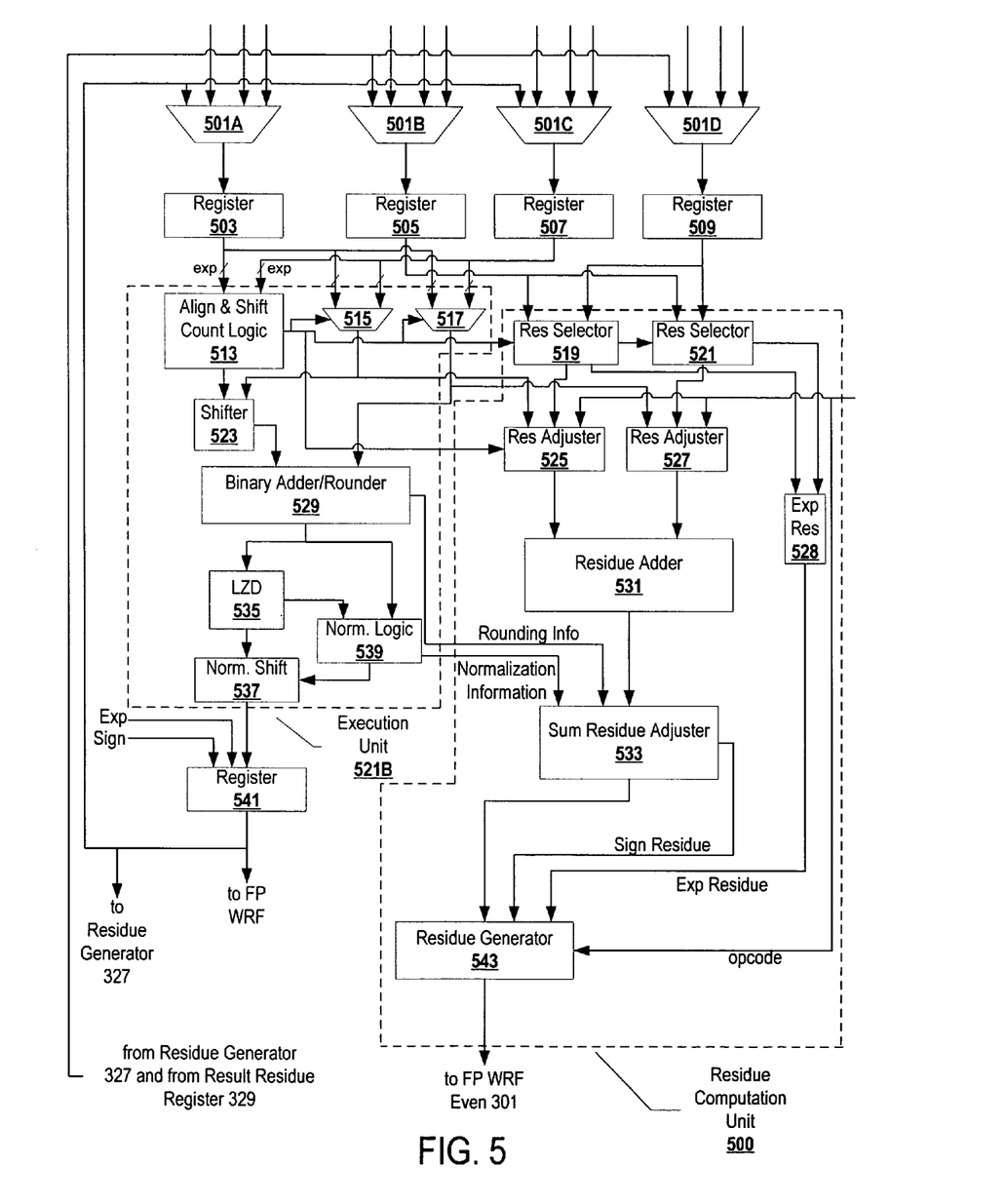
FIG. 5 depicts an exemplary floating point adder with residue-based error detection.

FIG. 5 depicts an exemplary floating point adder with residue-based error detection for single-precision addition. FIG. 5 includes multiplexers 501A-501D, which correspond to the multiplexers 315A-315H of FIG. 3. The multiplexers 501A and 501B are coupled to output to registers 503 and 505. The multiplexers 501C and 501D are coupled to output to registers 507 and 509. The registers 503 and 505 correspond to the even portion of the registers 317 and 319 of FIG. 3. The registers 507 and 509 correspond to the odd portion of the registers 317 and 319. The operand registers 503 and 507 host operands, and the residue registers 505 and 509 host residues. The operand registers 503 and 507 both are coupled to output exponents of input operands to an align and shift count logic 513, and coupled to output operands to multiplexers 515 and 517. The residue registers 505 and 509 are both coupled to output residues to residue selectors 519 and 521. In FIG. 5, a residue computation unit 500 includes residue selectors 519 and 521, residue adjusters 525 and 527, a residue adder 531, a sum residue adjuster 533, an exponent residue generator 528, and a residue generator 543.

The align and shift count logic 513 is coupled to control multiplexers 515 and 517 and output shift count information to the residue selectors 519 and 521, as well output information to the residue adjuster 525 and an alignment shifter 523. Hence, the larger operands are directed down the path through the multiplexer 517 and the smaller operands through the path of the multiplexer 515, while the residues of the larger operands flow from the residue selector 521 and the residues of smaller operands flow from the residue selector 519. The selected output of the multiplexers 515 and 517 are respectively output to the shifter 523 and a binary adder/rounder 529. The signs and exponents of the selected output of the multiplexers 515 and 517 are output to residue adjusters 525 and 527, respectively. The multiplexer 517 is also coupled to output a sign of its output to a residue generator 543. The residue adjusters 525 and 527 are coupled to respectively receive output from the residue selectors 519 and 521. The residue adjusters 525 and 527 are also coupled to receive opcodes. Both of the residue adjusters 525 and 527 are coupled to output to a residue adder 531. The residue adder 531 is coupled to output to a sum residue adjuster 533, which also receives input from the binary adder/rounder 529 and normalization logic 539.

The shifter 523 outputs to the binary adder/rounder 529. After alignment by the shifter, the binary operands are added by the binary adder/rounder 529, where the result is also rounded. The rounding bit and the residue of the bits shifted out (if any) by the operand with the smaller exponent are also sent to the sum residue adjuster 533, in order to properly adjust the operand residues. The binary adder/rounder 529 is coupled to output to a leading zero detector (LZD) 535 and the normalization logic 539, as well as the sum residue adjuster 533. The LZD 535 is coupled to output to a normalization shifter 537 and the normalization logic 539. The normalization shifter 537 is coupled to output to a result register 541, which also receives an exponent and a sign as input. The result in the result register 541 is output to a floating point working register file, and to a residue generator 327. The sum residue adjuster 533 is coupled to output to a residue generator 543, which outputs to a floating point working register file even, such as the floating point working register file even 301.

As with the floating point multiplier, the sign, exponent and mantissa of the floating point addition's result are calculated separately. The align and shift count logic 513 compares the floating point operands' exponents and swaps the operands' mantissas, if necessary, such that the smaller operand's mantissa (the mantissa of the operand with a smaller exponent) always goes to the alignment shifter 523. The same logic 513 also generates the shift count for the alignment shifter 523, which uses the value to shift right the smaller operand's value as a function of the shift count. The operand with the lower exponent (i.e., the operand selected by the multiplexer 515 in accordance with a control signal from the align and shift count logic 513) will get the shift count for the shift adjustment, while the other will get a value of zero (no shift) (i.e., the operand selected by the multiplexer 517 is output into the binary adder/rounder 529 instead of the shifter 523).

Single Precision Floating Point Add Operation

The residue adjusters 525 and 527 receive a sign and an exponent for corresponding operands and use them to adjust the residues of the operands (which is calculated over all three floating point data fields) in order to get the residue of the floating point ADD operands (i.e., the values to be operated upon by the binary adder/rounder 529). Since the mantissas of the operands, plus the "hidden one" bit, represent the ADD operands, the residue adjusters 525 and 527 first distill the mantissas' residues from their operand residues. The operand residues from the floating point working register file even (or floating point working register file odd) have been computed as follows:

$$\text{Resid} = (2^{31} * \text{Sign} + 2^{23} * \text{Exponent} + \text{Mantissa}) \bmod 3.$$

The residue adjusters 525 and 527 compute residues for their exponents. The residue adjusters 525 and 527 each use the sign and exponent residue of their corresponding input operand to compute the residue of the ADD operands as follows.

Resid_Mantissa=(Resid−2*Resid_Exponent−2*Sign)mod 3

Resid_Oprnd=($2^{23}$+Mantissa)mod 3=(2+Resid_Mantissa)mod 3

The floating point ADD operands each consist of their mantissa plus the "hidden one" bit. One bit indicating if the shift count is even or odd is also sent to the residue adjusters 525, which processes the smaller operand's shift, in order to adjust the smaller operand's residue accordingly. The adjustment is as follows:

Resid_smaller_oprnd=(((Even_shift_count)? 1:2)*(Resid_Oprnd−Resid_Shfted_Align_bits))mod 3

The residue adder 531 adds the Resid_Oprnd of the larger operand and the Resid_smaller_oprnd prior to rounding.

For the floating point addition of the operands, the result of the binary adder/rounder 529 goes through the LZD 535, in order to generate the normalizing shift count. This normalizing shift count is used to normalize the floating point instruction instance result in case of a subtract (add with different sign bits) whose result has a number of leading zeros. Such a result must be shifted left until the first one becomes the result's "hidden one" bit. The LZD 535 also communicates with the normalization logic 539, which generates data used by the sum residue adjuster 533 to adjust the residue from the residue adder 531. The rounding information and normalization information, which are supplied from the binary adder/rounder 529 and the normalization logic 539, are used by the sum residue adjuster 533 to generate a residue of the mantissa of the result eventually output to the register 541 from the normalization shifter 537. This information used by the sum residue adjuster 533 includes a rounding bit, data bit of the sum of the operands D[0] (because it might be shifted out if the exponent increment is one), indication of a special number or normal result, and an exponent increment/decrement. A bit indicating which of the operands (operand 1 or operand 2) determines the result's sign may also be utilized for some cases, as the residue logic does not have enough info to generate the sign by itself. The exponent increment/decrement is used not only to update the exponent residue accordingly, but also by the residue adder 531 that calculates the result's residue before rounding and normalization.

The instruction instance result, with the leading one (the hidden bit) truncated, represents only the mantissa of the result of adding (or subtracting) the floating point operands. The final value for the result register 541 is generated by concatenating this mantissa with the exponent and sign of the result. As each operand could represent either 32 bits of the mantissa of a double-precision (64-bit) operand or a single-precision operand, the residue of each 32-bit field of the instruction instance result is generated by the residue generator 327 before being saved into a floating point working register file or a floating point architecture register file at commit. Accordingly, the residue generator 543 combines the residue from the sum residue adjuster 533, the sign residue from the sum residue adjuster 533, and the exponent residue from the exponent residue generator 528. The residue generator 543 then computes a residue across the combined residues. The following exemplary operations indicate the exemplary operations that take place for operands, and the counterpart operations that take place for their corresponding residues.

Exponent Increment is One and Normal Result

This is the case where data bit D[25] of the result is one, so the mantissa of the result starts with bit D[24]. If a rounding bit of one is added, it is added to bit D[1] (bit D[0] becomes the Guard bit of the rounding in this case and is reflected in the Rounding_bit value). To generate the mantissa, bits D[25] and D[0] are removed from the sum and the rounding bit is added to D[1]. For a mod 3 residue, this affects the sum as follows (in order to get the result's mantissa):

Remove D[25]: subtract $2^{25}$ from the addition result, i.e. subtract 2 from (add 1 to) the calculated sum residue, mod 3

Subtract D[0]: subtract the (truncated) bit's value, provided by the normalization logic 539, from the calculated sum residue, mod 3

Add rounding bit (to D[1]): add 2*Rounding_bit to the calculated sum residue, mod 3

Shift the result 1 bit to the right: as the bit shifted out is zero (its value has already been subtracted) and the result is shifted by an odd number of bits, the shift is equivalent to multiplying the sum residue by 2, mod 3

The sum's exponent residue is calculated as:

Result_Exp_residue=(((Operand1 is larger)?
(Operand1_exp_resid):(Operand2_exp_resid))+1)mod 3

For the exponent increment to be one, both operands should have the same sign, so the result's sign is the same as any of the operands' sign.

Result sign=Operand1's sign(should be same as Operand2's sign)

The 32-bit result is the concatenation of the sign, exponent and mantissa fields and can be written as:

$2^{31}$*Result_Sign+$2^{23}$*Result_Exp+Result_Mantissa, so the 32 bit result's residue can be generated as:

($2^{31}$*Result_Sign+$2^{23}$*Result_Exp+Result_Mantissa)mod 3=
(2*Result_Sign+2*Result_Exp_residue+Result_Mantissa_residue)mod 3

Exponent Increment is Zero and Normal Result This is the case where data bit D[25] of the result is zero and D[24] is one, so the mantissa of the result starts with bit D[23] (D[24] is the hidden bit). If a rounding bit of one is added, it is added to bit D[0], so none of the result's bits are part of the rounding. To generate the mantissa, bit D[24] is removed from the addition result and the rounding bit is added to D[0]. For a mod 3 residue, this affects the addition result as follows (in order to get the mantissa of the sum):

Remove D[24]: subtract $2^{24}$ from the addition result, i.e. subtract 1 from (add 2 to) the calculated addition result residue, mod 3

Add rounding bit (to D[0]): add the rounding bit to the calculated addition result residue, mod 3

The larger of the two operands is identified because the larger operand determines both the sum's exponent and the sum's sign. The larger operand is identified by examining the exponents and the mantissas of the operands.

Result_Exp_residue=(Operand 1 is larger)?
(Operand1_exp_resid):(Operand2_exp_resid)

Result sign=(Operand1 is larger)? (Operand1_sign):(Operand2_sign)

As stated above, the residue of the sum is computed as follows:

$$(2*Result\_Sign+2*Result\_Exp\_residue+Result\_Mantissa\_residue) \bmod 3.$$

Exponent Decrement and Normal Result

This is the case where the floating point ADD operands have different signs, thus subtraction is performed. Depending on the exponent and mantissa value, a number of the result's bits (including the hidden bit) equal zero, so the result is shifted left by a number of bits equal to the exponent decrement, in order to bring the first 1 of the result into the hidden bit position. There is no rounding in this case, as the bits move left, instead of right. Computation of the mod 3 residue for the sum in this case is affected as follows (i.e., the following is performed in order to get the result's mantissa):

Shift the result to the left by a number of bits equal to the absolute value of the exponent's decrement: if the shift value for result normalization is even, the shift does not change the result's residue value (mod 3); if the shift value for result normalization is odd, the shifted result's residue becomes $(2*Resid\_result) \bmod 3$ Remove D[24] (the "hidden one" bit) from the result's residue, in order to get the result mantissa's residue: this is equivalent to subtracting $2^{24}$ from the addition result' residue, i.e. subtracting one from (or adding 2 to) the result's residue, mod 3

The corresponding equations are as follows:

$$Resid\_result\_mantissa=(Even|exp\_decr|)?\\((Resid\_result+2) \bmod 3):(((Resid\_result)*2+2) \bmod 3).$$

As with the preceding example, the larger of the two operands determines both the sum's exponent and the sum's sign. The following equations are implemented to compute the residue of the mantissa of the sum:

$$Result\_Exp\_residue=(Operand\ 1\ is\ larger)?\\((Operand1\_exp\_resid-|exp\_decr\_resid|) \bmod 3):\\((Operand2\_exp\_resid-|exp\_decrement\_resid|) \bmod 3)$$

$$Result\ sign=(Operand\ 1\ is\ larger)?\ (Operand1\_sign):\\(Operand2\_sign)$$

$$Result\_residue=(2*Result\_Sign+2*Result\_Exp\_residue+Result\_Mantissa\_residue) \bmod 3.$$

Special Number Result

As with multiplication, if the result is a special number (NaN etc.) the residue will not be checked at the commit stage. It is assumed that the calculation is correct, and, typically, the commit stage will communicate this condition to the pipeline by generating an exception (trap).

Double Precision Floating Point Addition

As with the above examples, the residue adjusters 525 and 527 generates the residue first, since the mantissas of the operands, plus the "hidden one" bit, represent the operands to be operated upon by the binary adder 529. Residues and their corresponding data are read from two FWRF or FARF entries for each operand. These entries hold the even and odd 32-bit halves for each of the operands. The 64-bit residue can be immediately computed using the even and odd residues, as follows:

$$Resid\_64b=(2^{32}*Odd\_32b+Even\_32b) \bmod 3=\\(Resid\_32b\_Odd+Resid\_32b\_Even) \bmod 3$$

As for double-precision operands:

$$Resid\_64b=\\(2^{63}*Sign+2^{52}*Exponent+Mantissa) \bmod 3$$

The sign values and residues of the exponents of the operands can be used to get the residues of the addition operands as follows:

$$Resid\_Mantissa=\\(Resid\_64b-Resid\_Exponent-2*Sign) \bmod 3$$

$$Resid\_Oprnd=(2^{52}+Mantissa) \bmod 3=\\(1+Resid\_Mantissa) \bmod 3\\(\text{where } 2^{52} \text{ accounts for the "hidden one" bit of}\\ \text{the operand}).$$

Once the operands' residue is calculated, the smaller operand's residue is adjusted using the bit indicating if the alignment shift count is an odd or an even number. In addition, the residue of the shifted out bits for the smaller operand are also adjusted. The align and shift count logic 513 provides both the indication of whether the alignment shift count was odd or even and the residue of the shifted out bits. The residue of the smaller operand is computed as follows:

$$Resid\_smaller\_oprnd=(((Even\_shift\_count)?\ 1:2)*\\(Resid\_Oprnd-Resid\_Shfted\_Align\_bits)) \bmod 3$$

The residue adder 531 then computes the residue of the sum computed thus far by the residue adder 531, prior to rounding.

Next, the residue adder 531 generates the sum's mantissa residue using the rounding information and the normalization information respectively provided by the binary adder/rounder 529 and the normalization logic 539. This information includes a rounding bit, data bit D[0] of the sum of the operands (because it might be shifted out if the exponent increment is one), indication of a special number or normal result, and an exponent increment/decrement. A bit indicating which of the operands (operand 1 or operand 2) determines the result's sign may also be utilized for some cases, as the residue logic does not have enough info to generate the sign by itself. The exponent increment/decrement is used not only to update the exponent residue accordingly, but also by the residue adder 531 that generates the result's mantissa. The logic used for floating point single precision addition can be utilized for floating point double precision addition, with the exception of having to accommodate the larger exponent and mantissa fields. In addition, the two 32-bit residues (even and odd) of the 64-bit double precision floating point addition result are respectively stored in the floating point working register file even and the floating point working register file odd.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 6:
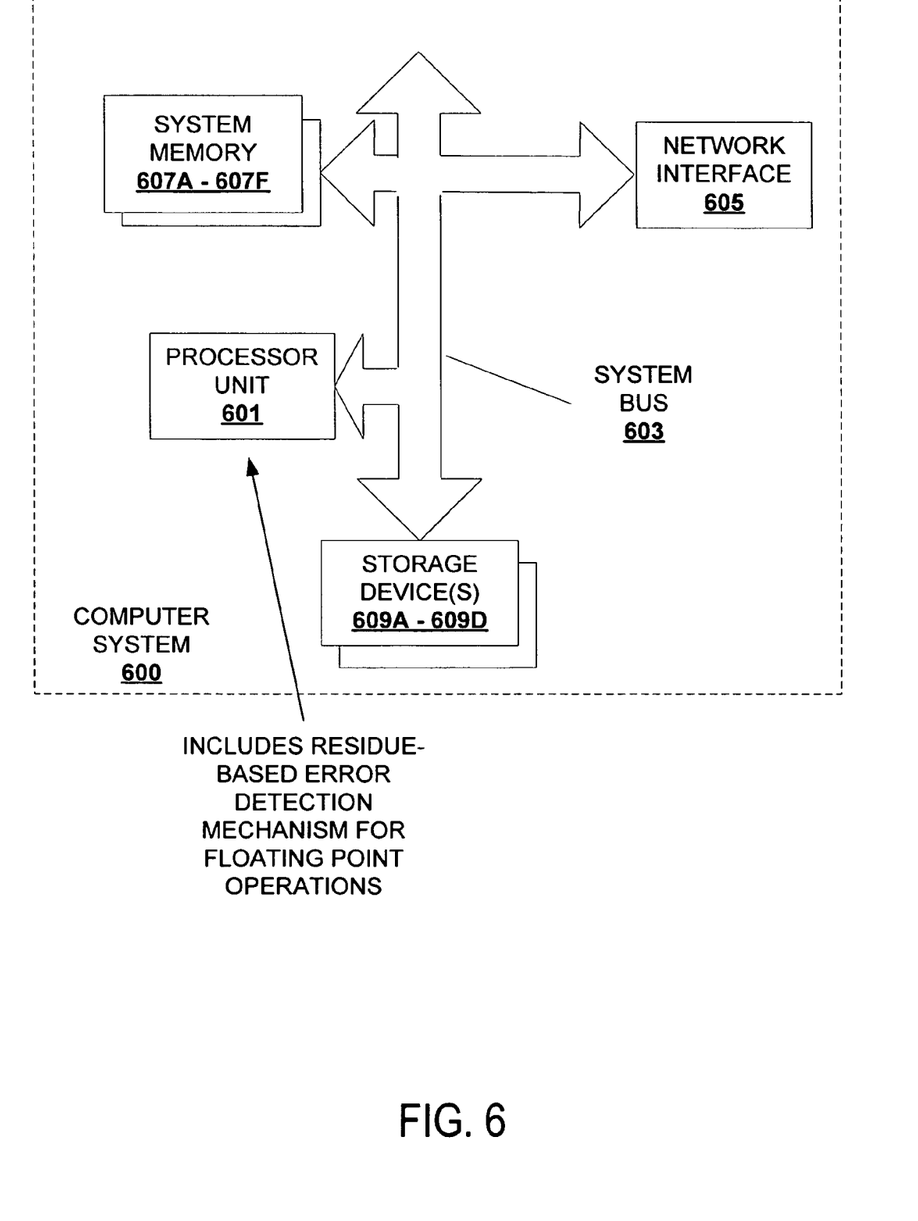
FIG. 6 depicts an exemplary computer system according to realizations of the invention.

FIG. 6 depicts an exemplary computer system according to realizations of the invention. A computer system 600 includes a processor unit 601 (possibly including multiple processors). The computer system 600 also includes a main memory 607A-607F (e.g., one or more of cache, SRAM, DRAM, RDRAM, EDO RAM, DDR RAM, EEPROM, etc.), a system bus 603 (e.g., LDT, PCI, ISA, etc.), a network interface 605 (e.g., an ATM interface, an Ethernet interface, a Frame Relay interface, etc.), and a storage device(s) 609A-609D (e.g., optical storage, magnetic storage, etc.). Realizations of the invention may include fewer or additional components not illustrated in FIG. 6 (e.g., video cards, audio cards, additional network interfaces, peripheral devices, etc.). The processor unit 601, the storage device(s) 609A-609D, the network interface 605, and the main memory 607A-607F are coupled to the system bus 603. The processor unit 601 includes a residue-based error detection mechanism. In some realizations of the invention, some functionality of the residue-based error detection may be embodied in the main memory 607A-607F.

While the invention has been described with reference to various realizations, it will be understood that these realizations are illustrative and that the scope of the invention is not limited to them. Many variations, modifications, additions, and improvements are possible. Despite depictions of direct coupling of units, additional units may be interposed, for example, to delay the flow of data and coordinate flows through the residue path and the data path. More generally, realizations in accordance with the present invention have been described in the context of particular realizations. For example, functionality may be separated or combined in blocks differently in various realizations of the invention or described with different terminology.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A microprocessor comprising:
an execution pipeline comprising:
a plurality of execution units,
a register file,
a residue computation unit,
a residue checking unit,
a first path of execution, that includes one or more of the execution units, configured to perform a floating point operation, and
a second path of execution, that includes the residue computation unit, configured to compute residues for a result of the floating point operation performed by the first path,
wherein the result of the floating point operation and the residue for the result of the floating point operation are stored in the register file,
wherein the residue checking unit detects errors in an operand of the floating point operation, the result of the floating point operation, and the residue of the result of the floating point operation at a time of decision of whether to commit the result of the floating point operation, and wherein the residue checking unit detects errors using residues computed by the residue computation unit and the residue checking unit for end-to-end protection of the microprocessor's execution pipeline,
wherein the residue checking unit is configured to generate a residue from a result of a floating point operation and compare the generated residue against a corresponding residue computed by the second path, and operable to indicate whether an error is detected based, at least in part, on the comparison, and
wherein the residue checking unit is further operable to assemble a residue for a result of a double precision floating point operation from first and second partial residues computed by the second path, wherein the first and second partial residues respectively correspond to an even and odd portion of the double-precision result.

2. The microprocessor of claim 1, wherein the residue checking unit detects one or more errors that occur while a floating point instruction instance is resident in the execution pipeline.

3. The microprocessor of claim 2, wherein the detection of errors while an instruction instance is resident in the execution pipeline includes detecting errors that occur in either or both of registers that host floating point operands for floating point operations and execution units of the first path.

4. The microprocessor of claim 1 further comprising an error correction mechanism that corrects errors detected by the microprocessor.

5. The microprocessor of 1, wherein the first path includes one or more of a floating point adder and a floating point multiplier.

6. The microprocessor of claim 5, wherein the first path also includes data selectors operable to parse operands in accordance with precision of a floating point operation and coupled to supply exponents and signs of parsed operands to the second path.

7. The microprocessor of claim 6, wherein the second path includes residue adjusters operable to use signs and exponents supplied from the data selectors to distill operand mantissa residues from respective operand residues.

8. The microprocessor of claim 7, wherein one of the residue adjusters distilling a residue of a mantissa of an operand from a residue of the operand comprises the one residue adjuster being operable to decrement a residue of an exponent of the operand and a sign of the operand from the residue of the operand.

9. The microprocessor of claim 8 further comprising the residue adjusters being operable to adjust operand mantissa residues to account for hidden one bits.

10. The microprocessor of claim 1, wherein the second path includes one or more units operable to adjust an intermediate residue computed from residues of mantissas of operands of a floating point operation to account for rounding performed in the first path.

11. The microprocessor of claim 10 further comprising the one or more units of the second path being operable to also account for normalization performed in the first path.

12. The microprocessor of claim 1, wherein the second path includes a residue generator operable to concatenate an intermediate residue, a sign residue, and an exponent residue, and compute a residue from the concatenated residues, wherein the intermediate residue is a residue of a mantissa of a result of a floating point operation performed in the first path.

* * * * *